(12) United States Patent
Scheidt (10) Patent No.: US 7,095,851 B1
(45) Date of Patent: Aug. 22, 2006

(54) VOICE AND DATA ENCRYPTION METHOD USING A CRYPTOGRAPHIC KEY SPLIT COMBINER

(75) Inventor: Edward M. Scheidt, McLean, VA (US)

(73) Assignee: Tecsec, Inc., Vienna, VA (US)

( * ) Notice: Subject to any disclaimer, the term of this patent is extended or adjusted under 35 U.S.C. 154(b) by 0 days.

(21) Appl. No.: 09/936,315

(22) PCT Filed: Mar. 10, 2000

(86) PCT No.: PCT/US00/06110

§ 371 (c)(1),
(2), (4) Date: Jan. 17, 2002

(87) PCT Pub. No.: WO00/54455

PCT Pub. Date: Sep. 14, 2000

Related U.S. Application Data (60) Provisional application No. 60/124,086, filed on Mar. 11, 1999.

(51) Int. Cl.
  *H04L 9/00* (2006.01)
  *H04L 9/28* (2006.01)
  *H04K 1/00* (2006.01)

(52) U.S. Cl. .................. 380/44; 713/169; 713/170; 713/171; 713/176; 380/283; 380/284; 380/285; 380/28

(58) Field of Classification Search ........ 380/283–285, 380/28–30; 713/169–171, 176, 200–202
See application file for complete search history.

(56) References Cited

U.S. PATENT DOCUMENTS

| | | | |
|---|---|---|---|
| 4,145,568 A | 3/1979 | Ehrat | |
| 4,200,770 A | 4/1980 | Hellman et al. | |
| 4,218,582 A | 8/1980 | Hellman et al. | |
| 4,864,616 A | 9/1989 | Pond et al. | |
| 5,276,738 A | 1/1994 | Hirsch | |
| 5,311,595 A * | 5/1994 | Bjerrum et al. | 713/169 |
| 5,499,297 A | 3/1996 | Boebert | |
| 5,541,994 A | 7/1996 | Tomko et al. | |
| 5,557,678 A | 9/1996 | Ganesan | |
| 5,627,894 A | 5/1997 | Albert et al. | |
| 5,657,390 A * | 8/1997 | Elgamal et al. | 713/151 |
| 5,694,472 A | 12/1997 | Johnson et al. | |
| 5,710,815 A | 1/1998 | Ming et al. | |
| 5,751,808 A | 5/1998 | Anshel et al. | |
| 5,761,305 A | 6/1998 | Vanstone et al. | |
| 5,778,069 A | 7/1998 | Thomlinson et al. | |
| 5,796,833 A * | 8/1998 | Chen et al. | 713/156 |
| 5,815,573 A | 9/1998 | Johnson et al. | |
| 5,857,025 A | 1/1999 | Anderson et al. | |
| 6,009,176 A * | 12/1999 | Gennaro et al. | 713/170 |

FOREIGN PATENT DOCUMENTS

WO    WO 98 36520 A    8/1998

OTHER PUBLICATIONS

Adamouski, "Encryption Technology Other Than PKI," Security Technology, Oct. 12, 1998, pp. 108-116, ISBN: 0-7803-4535-5, USA.

* cited by examiner

*Primary Examiner*—Christopher Revak
*Assistant Examiner*—Longbit Chai
(74) *Attorney, Agent, or Firm*—IP Strategies (57) ABSTRACT

A cryptographic key split combiner, which includes a number of key split generators (42, 48, and 56) for generating cryptographic key splits (32, 34, 36, 38, and 64) and a key split randomizer for randomizing the cryptographic key splits to produce a cryptographic key (62), and a process for forming cryptographic keys. Each of the key split generators (42, 48 and 56) generates key splits (32, 34, 36, 38, and 64) from seed data (40, 44, 46, 50, 52, 54, 58, and 60). The key split generators may include a random split generator (42) for generating a random key split (32) based on reference data (40) and encryption date/time (44). Other key split generators may include a token split generator (48) for generating a token key split (34) based on label data (46) and organization data (50), a console split generator (56) for generating a console key split (36) based on current maintenance data (52) and previous maintenance data (54), and a biometric split generator for generating a biometric key split (38) based on biometric data (58). All splits may further be based on static data, which may be updated, for example by modifying a prime number divisor of the static data. The label data may be read from a storage medium, and may include user authorization data. The label data may be associated with label categories and subcategories of addresses, which are meaningful to a user who is specifying or determining the intended recipient(s) of the encrypted information or object. An array associated with a software component object may use key splits (32, 34, 36, 38, and 64) which determine which methods and properties are allowed and control access to the memory address for those allowed methods and properties. The resulting cryptographic key (62) may be, for example, a stream of symbols, at least one symbol block, or a key matrix.

3 Claims, 5 Drawing Sheets

VOICE AND DATA ENCRYPTION METHOD USING A CRYPTOGRAPHIC KEY SPLIT COMBINER

This application claims the benefit of Provisional Application No. 60/124,086, filed Mar. 11, 1999.

CROSS-REFERENCE TO RELATED PATENTS AND APPLICATIONS

This disclosure incorporates the entire written descriptions of U.S. Pat. No. 5,410,599, entitled "Voice and Data Encryption Device," which issued on Apr. 25, 1995 to CROWLEY et al., and U.S. Pat. No. 5,375,169, entitled "Cryptographic Key Management Method and Apparatus," which issued on Dec. 20, 1994 to SCHEIDT et al.

This is related to U.S. Pat. No. 5,787,173, entitled "Cryptographic Key Management Method and Apparatus," which issued on Jul. 28, 1998 to SCHEIDT et al. This is also related to the following co-pending U.S. patent applications: Ser. No. 09/023,672, entitled "Cryptographic Key Split Combiner," filed on Feb. 13, 1998 by SCHEIDT et al.; Ser. No. 09/874,364, entitled "Cryptographic Key Split Combiner," filed on Jun. 6, 2001 by SCHEIDT et al.; Ser. No. 09/917,795, entitled "Cryptographic Key Split Combiner," filed on Jul. 31, 2001 by SCHEIDT et al.; Ser. No. 09/917,794, entitled "Cryptographic Key Split Combiner," filed on Jul. 31, 2001 by SCHEIDT et al.; Ser. No. 09/917,802, entitled "Cryptographic Key Split Combiner," filed on Jul. 31, 2001 by SCHEIDT et al.; Ser. No. 09/917,807, entitled "Cryptographic Key Split Combiner," filed on Jul. 31, 2001 by SCHEIDT et al.; Ser. No. 09/992,529, entitled "Cryptographic Key Split Combiner," filed on Nov. 20, 2001 by SCHEIDT et al.; Ser. No. 09/205,221, entitled "Access Control and Authorization System," filed on Dec. 4, 1998 by SCHEIDT et al.; Ser. No. 09/388,195, entitled "Encryption Process Including a Biometric Input," filed on Sep. 1, 1999 by SCHEIDT; Ser. No. 09/418,806, entitled "Cryptographic Information and Flow Control," filed on Oct. 15, 1999 by WACK et al.; Ser. No. 10/035,817, entitled "Electronically Signing a Document," and filed on Oct. 25, 2002 by SCHEIDT et al.; Ser. No. 10/060,039, entitled "Multiple Factor-Based User Identification and Authentication," filed on Jan. 30, 2002 by SCHEIDT et al.; and Ser. No. 10/060,011, entitled "Multiple Level Access System," filed on Jan. 30, 2002 by SCHEIDT et al.

TECHNICAL FIELD

The present invention relates to cryptographic systems, and to methods of encrypting telecommunication between a transmit space and a receive space. In particular, the present invention relates to a system for formulating cryptographic keys used to encrypt plaintext messages or embedded objects and decrypt ciphertext communications media, and to the transmission of voice and data in encrypted form, including among more than two parties, and the selective reception and decryption of that voice and data.

BACKGROUND ART

In the modern world, communications are passed between parties in a variety of different ways utilizing many different communications media. Electronic communication is becoming increasingly popular as an efficient manner of transferring information, and electronic mail in particular is proliferating due to the immediacy of the medium. Another communications medium at the software program level defines an object as a particular piece of compiled code that provides a specific service within the overall system.

Unfortunately, drawbacks accompany the benefits provided by electronic communication, particularly in the area of privacy. Electronic communications may be intercepted by unintended recipients. Wireless transmissions, such as voice communication by cellular telephone, and electronic mail are especially susceptible to such interception. Also, the retention of information on a computing system may raise other privacy issues. Multiple users on a common computing device and separation of information for multiple applications for a network of users communicating different categories of information are among the scenarios for which privacy may be a concern. In another context, the idea of privacy may extend beyond keeping information from prying eyes; the integrity of software program objects may be a concern. The manipulation or other modification of an object can cause results unintended by the creator of the object.

The problem of electronic communication privacy has been addressed, and solutions to the problem have been put in place. One form of solution uses cryptography to provide privacy for electronic communication. Cryptography involves the encrypting or encoding of a transmitted or stored message or object, followed by the decryption or decoding of a received or retrieved message or object. The message or object usually takes the form of a digital signal, a digitized analog signal, or a functionality of the object. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message (or object) and a cryptographic key, and encrypts the plaintext message (or object) with the key according to an encrypt relation that is predetermined for the plaintext communication and the key. That is, the message or object is manipulated with the key in a predetermined manner set forth by the text/key relation to produce a ciphertext (encrypted) message or object.

Likewise, the decrypting side of the communication incorporates a decoding device or decrypting engine. The decoding device accepts the ciphertext message (or object) and a cryptographic key, and decrypts the ciphertext message with the key according to a decrypt relation that is predetermined for the ciphertext message (or object) and the key. That is, the message (or object) is manipulated with the key in a predetermined manner set forth by the text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication. Such public-key schemes have been described extensively in the relevant technical literature, most notably by Martin E. Hellman, Bailey W. Diffie, and Ralph C. Merkle (see, for example, U.S. Pat. No.

4,200,770 and No. 4,218,582, collectively referred to herein as "the Diffie-Hellman scheme").

An important consideration in determining whether a particular cryptographic scheme is adequate for the application is the degree of difficulty necessary to defeat the cryptography, that is, the amount of effort required for an unauthorized person to decrypt the encrypted message. One way to improve the security of the cryptographic scheme is to minimize the likelihood that a valid key can be stolen, calculated, or discovered. The more difficult it is for an unauthorized person to obtain a valid key, the more secure communications will be under a particular scheme.

DISCLOSURE OF THE INVENTION

It is therefore an objective of the present invention to provide a process and apparatus for assembling keys which provides added security against compromising a communications medium, which may include software component objects, by unauthorized entities.

It is a further objective of the present invention to provide a process and apparatus for developing key components that cannot be reproduced by unauthorized parties.

The invention has at least the following further objectives:
a. to advance the implementation of public key usage with access control through symmetric encryption;
b. to adapt Constructive Key Management ("CKM", as described herein) for use with a transmission medium;
c. to use public and CKM key methodologies to establish a private link or a conference capability for voice or data using an analogue or digital telephone, or from a telephone to a computing base such as the Internet;
d. to add an error detection field to a conference encryption setup to ensure data integrity and to facilitate a quicker encryption connection between telephones;
e. to provide a method for session keys to be securely established between two telephones;
f. to use a portable voice and data encryption platform that consists of a voice and/or data module, and encryption and control module, and a modem module; and
g. to provide a viewing module, such as an LED, on the platform, to present a visual confirmation of the number of other platform users that are to be included in the encryption process, and to identify a platform user by a number that can be confirmed by the sender as an authentication feature.

These and other objectives and advantages are provided by a cryptographic key split combiner, which includes a number of key split generators for generating cryptographic key splits and a key split randomizer for randomizing the cryptographic key splits to produce a cryptographic key. Each of the key split generators generates key splits from seed data. The source of the seed data can be a pseudorandom or random data sequence that may be included in a key management scheme that uses the key splits for determining the data cryptographic or session key. The management of the key splits can include provision of a source for the seed data and a distribution process to ensure that the desired combination of key splits is generated.

In one embodiment of the present invention, the key split generators include a random split generator for generating a random key split based on reference data. The random split generator may generate a random sequence based on the reference data, or may generate a pseudorandom sequence based on the reference data. The random key split may further be based on chronological data. The random key split may instead be based on the reference data and on static data, which may be updated. One manner of updating the static data is by modifying a prime number divisor of the static data.

Other key split generators may include, for example, a token split generator for generating a token key split based on label data and/or organization data and/or static data; a console split generator for generating a console key split based on maintenance data, whether previous or current, and/or on static data; an asymmetrical key split generator for generating pair-wise data; and a biometric split generator for generating a biometric key split based on biometric data, which may include biometric data vectors and on biometric combiner data, and/or static data. The label data may be associated with label categories and sub-categories of addressees, which are meaningful to a user who is specifying or determining the intended recipients(s) of the encrypted information or object. The label data may be read from a storage medium, and may include user authorization data. The resulting cryptographic key may be, for example, a stream of symbols, at least one symbol block, or a key matrix.

An asymmetrical key split generator may be used to ensure the integrity of one or more of the key split generators, such as the random key split, or to ensure the integrity of the sender's data.

The key split generators may be used to determine which, if any, methods and properties are allowed in a software program that includes component objects. A component object is a compiled piece of software code in computer memory, which has an array of memory addresses, and indicates relatively where in memory certain functions or methods and data or properties of that object are stored. An array associated with the component object may use key splits which determine which methods and properties are allowed and control access to the memory address for those allowed methods and properties.

The present invention also includes a process for forming cryptographic or session keys, which includes generating a plurality of cryptographic key splits from seed data and randomizing the cryptographic key splits to produce a cryptographic key. The process can include generating reference pointers to the key splits that would facilitate the selection of key splits during the encrypting or decrypting process. Once the data or object is encrypted, these pointers can be included with the ciphertext.

The cryptographic key splits may include, for example, a random key split based on reference data, a token key split based on label data, a console key split based on maintenance data, and a biometric key split based on biometric data. These key splits may be random sequences or pseudorandom sequences.

Generating the random key split may include generating a key split based on the reference data and on chronological data, or based on the reference data and on static data. Generating the token key split may include generating a key split based on the label data, which may be read from a storage medium and may include authorization data, and on organization data, or based on the label data and on static data. Generating the console key split may include generating a key split based on previous maintenance data and on current maintenance data, or based on the maintenance data and on static data. Generating the biometric key split may include generating a key split based on biometric data vectors and on biometric combiner data, or based on the biometric data and on static data.

The static data provided for any of the key splits may be updated. Updating the static data may include modifying a prime number divisor of the static data.

The resulting cryptographic or session key may be a stream of symbols, at least one symbol block, or a key matrix.

According to a further aspect of the invention, a portable voice and data encryption platform is provided for use with telephone, cellular, or satellite devices to transmit voice and data in encrypted form. A control logic that is part of the platform manages the analog and data sequence. See Crowley et al. An information channel between two or more telephones, two or more faxes, or two or more computers is established with an initial public key exchange that securely distributes CKM key fragments. The public keying material may be established on-the-fly with only pre-computed and distributed parameters common among the parties of the information channel; in such cases, there is no data or key recovery capability, and the session public keying fragments are generated and exchanged immediately prior to the session. A set of a private link label and a conference label that consists of a random or pseudo-random number is concatenated to a session random number that results in a combined label and random number used for the session key. The combined session key results in an identical complete key used to encrypt or decrypt the voice or data. The choice of either label depends on the user's selection for a two-party link or for a conference call that may be either a casual or collective call. The combined conference session key is appended with an error detection field that is mathematically calculated based on the session key.

The implementation of public key usage with access control is provided through symmetric encryption, wherein the public key may be based on known algorithms, such as Diffie-Hellman or Elliptical Curve algorithms. Constructive Key Management is adapted for use with a transmission medium. Diffie-Hellman focuses on pre-position key fragments, the building of a session key from these fragments, and the use of labels manifested through key fragments that are used to add the variable random function that is part of the session key. The label key fragments may be symmetric or asymmetric depending on whether there is an enforced read/write requirement through software (symmetric) or through encryption (asymmetric). The number of bits for a label and the random number is dependent on the selected digital encryption algorithm (for example, the Data Encryption Standard may be used). Public and CKM key methodologies are used to establish a private link or a conference capability for voice or data using an analogue or digital telephone, or from a telephone to a computing base such as the Internet. An error detection field is added to a conference encryption setup to ensure data integrity and to facilitate a quicker encryption connection between telephones. A method is provided for session keys to be securely established between two telephones. A portable voice and data encryption platform is used, which consists of a voice and/or data module, and encryption and control module, and a modem module (see Crowley et al.). The platform may consist of a device that is connected between the handset and phone instrument (in this case, an analog voice is converted to digital, the digital block data is encrypted, and the resultant encrypted data is converted back to analog to be switched within a POTS network). A viewing module, such as an LED, is available with the platform. The LED can be used to present a visual confirmation of the number of other platform users that are to be included in the encryption process. The LED can also identify a platform user by a number that can be confirmed by the Sender as an authentication feature.

BRIEF DESCRIPTION OF DRAWINGS

The present invention will be more completely understood by way of the following detailed description, with reference to the following drawings, wherein.

BEST MODES FOR CARRYING OUT THE INVENTION

Figure 1:
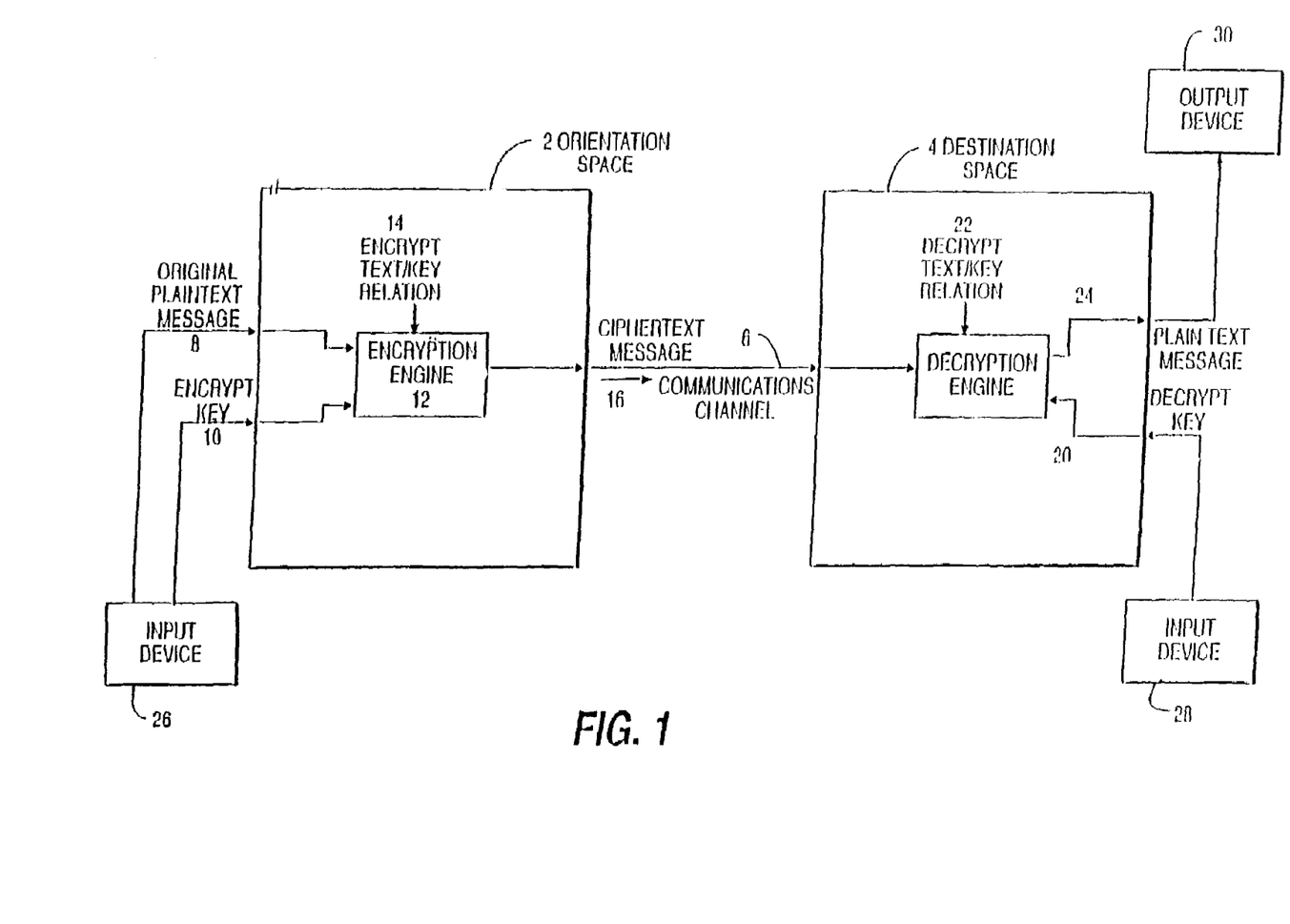
FIG. 1 shows a block diagram of a communications event featuring cryptography.

Referring to FIG. 1, a communication has an origination space 2 and a destination space 4. The origination space 2 defines the place and time at which the communication originates. The destination space 4 defines the place and time at which the communication is intended to be decoded. The origination space 2 and the destination space 4 may be remote in location. Alternatively, they may be collocated but displaced in time. The space and time correspondence between the origination space 2 and the destination space 4 depends on the nature of a particular communication. The origination space 2 and destination space 4 are coupled to a common communications channel 6. This communications channel 6 may bridge a physical space, such as empty air in the case of a cellular voice telephone call. Alternatively, the communications channel 6 may be temporary storage for the communication while time passes between the origination space 2 and the destination space 4, such as a message left in memory on a computer by a first user, for a second user to read at a later time on the same computer. The communications channel 6 may also be a combination of the two, such as telephone cables and storage memory in the case of an electronic mail transmission. The communications channel 6 may also be a component object in computer memory.

A component object is a compiled piece of software code in computer memory, which has an array of memory addresses, and indicates relatively where in memory certain functions or methods and data or properties of that object are stored. An application programmer makes use of the component object by obtaining a pointer to the memory that contains the array. This is known in the art as creating an instance of a component object. The programmer can then make use of the methods and properties of the component object by indirectly addressing them via the array.

At the origination space 2, the original plaintext message 8 is received and encrypted according to the encrypt text/key relation 14, using a provided encrypt key 10, to create a ciphertext message 16. The ciphertext message 16 is received at the destination space 4 via the communications channel 6. An authorized entity having a proper decrypt key 20 can then provide the decrypt key 20 to the destination space 4, where it is applied to the ciphertext message 16 according to a decrypt text/key relation 22 to create a new plaintext message 24 which corresponds to the original plaintext message 8.

The origination space 2 and the destination space 4 can be, for example, computers, or even the same computer. An exemplary computer may have a certain amount of storage space in the form of memory for storing the text/key relation. A microprocessor or similar controller, along with a control structure and random access memory for storing original plaintext and keys provided by a user, can be included in each space and can perform the functions of the encryption/decryption engine. An input device 26, 28, such as a keyboard, floppy disk drive, CD-ROM drive, or biometrics reader, can also be provided for accepting the key and plaintext message from the origination user, and the key from the destination user. At the destination space 4, an output device 30, such as a monitor, disk drive, or audio speaker, may also be provided to present the new plaintext message to the destination user. The text/key relation can be stored on a floppy disk or other permanent or temporary portable storage, rather than in hard storage in the computer, to allow different text/key relations to be applied by different users or in different situations.

Figure 2:
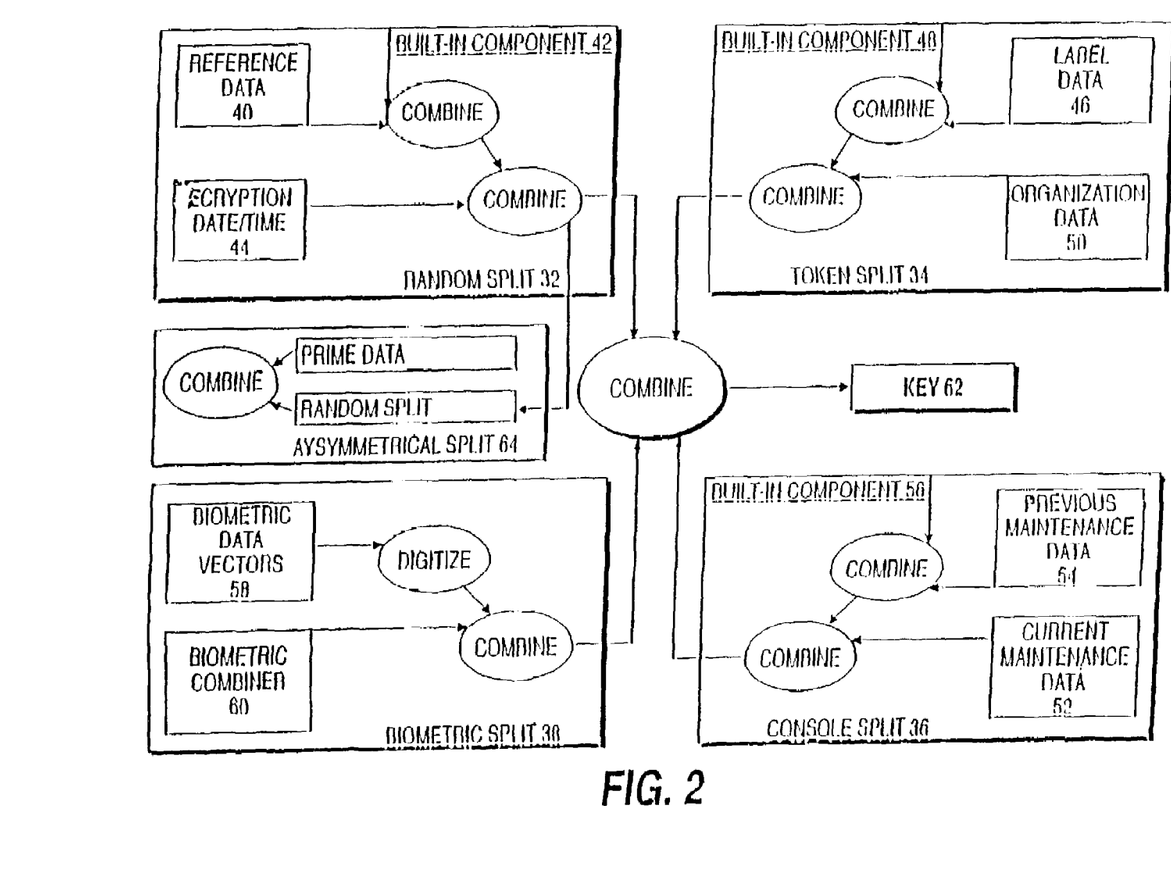
FIG. 2 is a block diagram of a key split combiner.

The keys that are provided at the origination space and at the destination space may be composed of several components, or splits, each of which may be provided by a different source. As shown in FIG. 2, a random key split 32 may be randomly or pseudorandomly generated. A second split 34 may be stored on a token. A third split 36 may be stored on a console, and a fourth split 38 may be provided by a biometric source. The key splits may be combined to form a complete cryptographic key. This key may take the form of a stream of symbols, a group of symbol blocks, an N-dimensional key matrix, or any other form usable by the particular encryption scheme.

The random split 32 provides a random component to the cryptographic key. This split 32 is randomly or pseudorandomly generated based on a seed which is provided by any source as reference data 40. For example, when a user attempts to log on to a system, the date and time of the user's log-on attempt, represented in digital form, can be used as a seed to generate the key split. That is, the seed may be provided to a pseudorandom sequence generator or other randomizer to produce the random split. Such pseudorandom sequence generators are well known in the art. For example, a simple hardware implementation could include a shift register, with various outputs of the register XORed and the result fed back to the input of the register. Alternatively, the seed may be combined, or randomized, with a built-in component 42, such as a fixed key seed stored at the origination space. The randomization may be performed, for example, by applying a variation of the text/key relation to the generated seed and the stored fixed key seed. This result may be further randomized with, for example, a digital representation of the date and time of the encryption 44, in order to produce the random key split 32.

The token split 34 may be generated in a similar fashion. In this case, the seed is provided on a token, that is, it is stored on a medium that is possessed by the user. For example, the seed may be stored on a floppy disk that the system must read as part of the encryption procedure. The token may store a number of different seeds, or label data 46, each of which corresponds to a different authorization provided by the system or specified by the user. For example, one seed may be used to generate a key split to authorize a particular user to read a message at a particular destination space. Another key seed may be used to generate a key split to authorize any member of a group of users to read a message at any destination space, and for one particular user to read the message and write over the message at a particular destination space. The label data 46 may even designate a window of time during which access to the communication is valid. This seed may be randomized with a built-in component 48, such as a seed stored at the origination space, which may then be further randomized with organization data 50 provided to the organization to which the user belongs.

The console split 36 is derived from a changing value stored at a user space, such as on a system console. Maintenance data, such as the checksum taken from a defragmentation table set, may be used to produce such changing values. For example, the current maintenance data 52 may be randomized with particular previous maintenance data. Alternatively, all previous maintenance data 54 may be randomized with a built-in component 56 stored at the origination space, the results of which are XORed together and randomized with the current maintenance data 52. The randomization result of the changing value is the console split 36.

The biometric split 38 is generated from biometric data vectors 58 provided by biometric samples of the user. For example, a retinal scanner may be used to obtain a unique retinal signature from the user. This information, in digital form, will then be used to generate the biometric split 38. This may be accomplished by, for example, randomizing a digital string corresponding to the biometric vectors 58 with biometric combiner data 60, which may be a digital hash of the user's system identification number or some other identifying data that can be linked to the user's physical data provided by the biometric reader. The resulting randomized data is the biometric split 38. The biometric split 38 provides information that is incapable of being reproduced by anyone but the user providing the biometric data vector 58.

The built-in key split components 42, 48, 56 described herein may be static in that they do not change based on uncontrolled parameters within the system. They may be updated for control purposes, however. For example, the built-in key split components 42, 48, 56 may be changed to modify the participation status of a particular user. The key split component may be changed completely to deny access to the user. Alternatively, only a single prime number divisor of the original key split component may be taken from the key split component as a modification, in order to preserve a legacy file. That is, the user will be able to access versions of the file created prior to the modification, but will not be allowed to change the file, effectively giving the user read-only access. Likewise, modification of the key split component can be effected to grant the user broader access.

According to one cryptographic scheme that may be used in accordance with the present invention, a prime number and a random number are generated from a data seed source for one or more of the communicating parties. The random number can be used in the "public" domain, such as on a public server, or may be negotiated between the parties prior to the communications process. To establish communications between two parties, a polynomial or modulo calculation is made of the sender's prime number and the recipient's random number for the sender. The recipient calculates the recipient's prime number and the sender's random number. The two-way calculation creates a cryptographic or session key that is used to encrypt the random key split or encrypt a hash of the transmitted or stored message, thereby creating an asymmetrical split 64. The other key split generators that are used for the encrypting side of the communications provide integrity to the asymmetrical key split generator.

Once the key splits 32, 34, 36, 38 have been generated, they may be randomized together to produce the cryptographic key 62 for the communication. In performing each combination to generate the complete cryptographic key, a different variation of the text/key relation may be applied. The use of a plurality of different text/key relation variations adds to the security of the overall cryptographic scheme. It is contemplated that key splits other than those specifically described herein may be combined in forming the complete key 62. The total number of splits may also vary, and these splits may be used to build a key matrix to add to the complexity of the system. This complete key 62 should be in a form suitable for use in the particular cryptographic scheme. That is, different fields in the key may have different functions in the protocol of the communication, and should be arranged accordingly within the key.

At the destination space, the process is reversed in order to determine whether a user attempting to access a message has authorization, that is, has the valid key. The key supplied by the user at the destination space must include information required by the labels that were used to create the token split at the origination space. This information may also take the form of a token split. Further, a biometric split may be required as part of the destination key, in order to provide a link between assigned identification data for the user and physical data collected from the user biometrically. The token split and the biometric split may be combined with other splits at the destination space to form the complete destination key.

Figure 3:
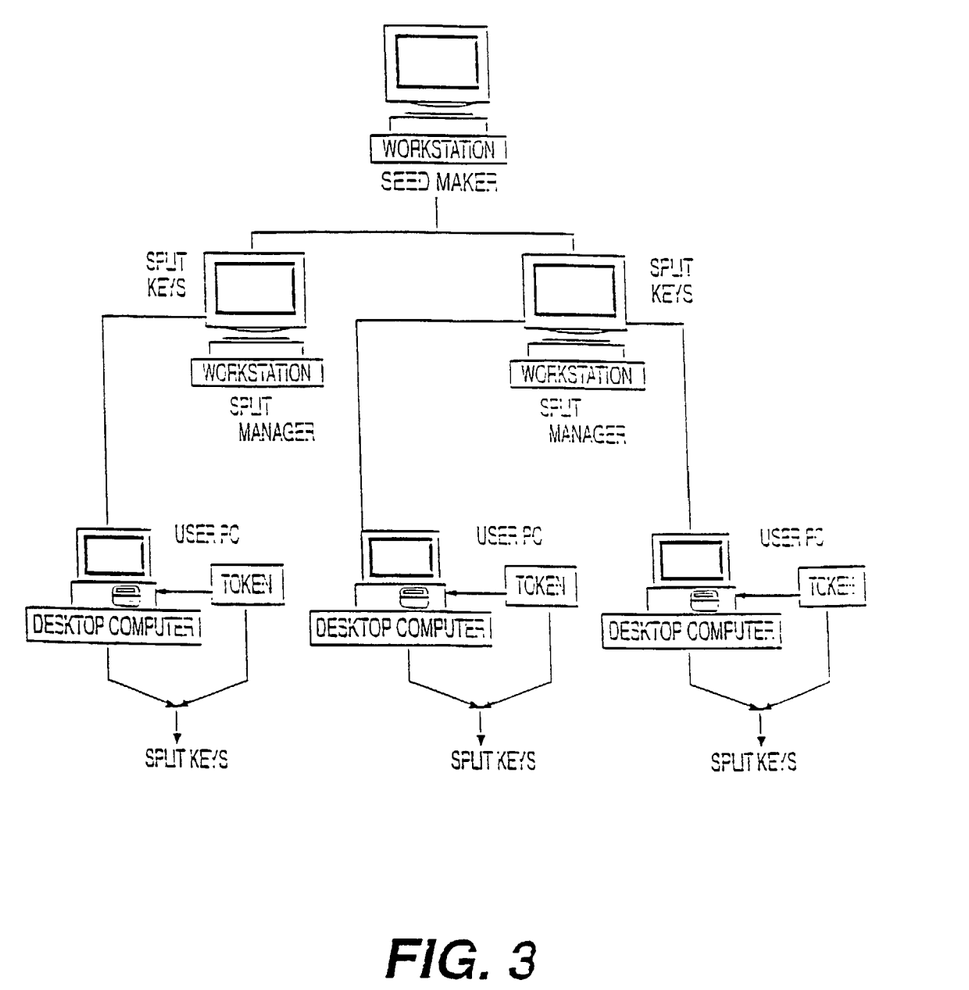
FIG. 3 is an exemplary hardware implementation of the key generation aspect of the present invention.

FIG. 3 shows an exemplary hardware implementation for generating and managing the keys according to the present invention.

In the case of component object control, the array of addresses can be encrypted in the executable file of the component object. The application program using the component object can then call a special "create instant" function to pass along key splits or label representations. The "create instant" will: 1) using the key splits, determine which, if any, methods and properties are allowed, based on the passed key splits; 2) decrypt the memory address for those allowed methods and properties; and 3) modify the addresses of the methods and properties that are not allowed, thereby to instead call a "stub" function which will return an error code corresponding to the determination of no authorization. Note that there is no attempt to encrypt application data as it is passed to and from the component object.

The following description relates to use of the described methodology for provision of a private voice or data link, or for provision of conference capability.

The Process

A public key establishment is used based on Diffie-Hellman key agreement. Each platform device is loaded with a universal (common) set of Diffie-Hellman parameters designated as P, Q, and G. From these parameters, a public/private pair of public key fragments can be generated by each platform. A random or pseudo-random number generation and storage capability exists with each platform. A pair of CKM labels (ID number and random number per label) can be generated by each platform.

One of the platform users is designated as the Sender (S) to initiate and manage the encryption exchange among one or more of other platform users.

Figure 4:
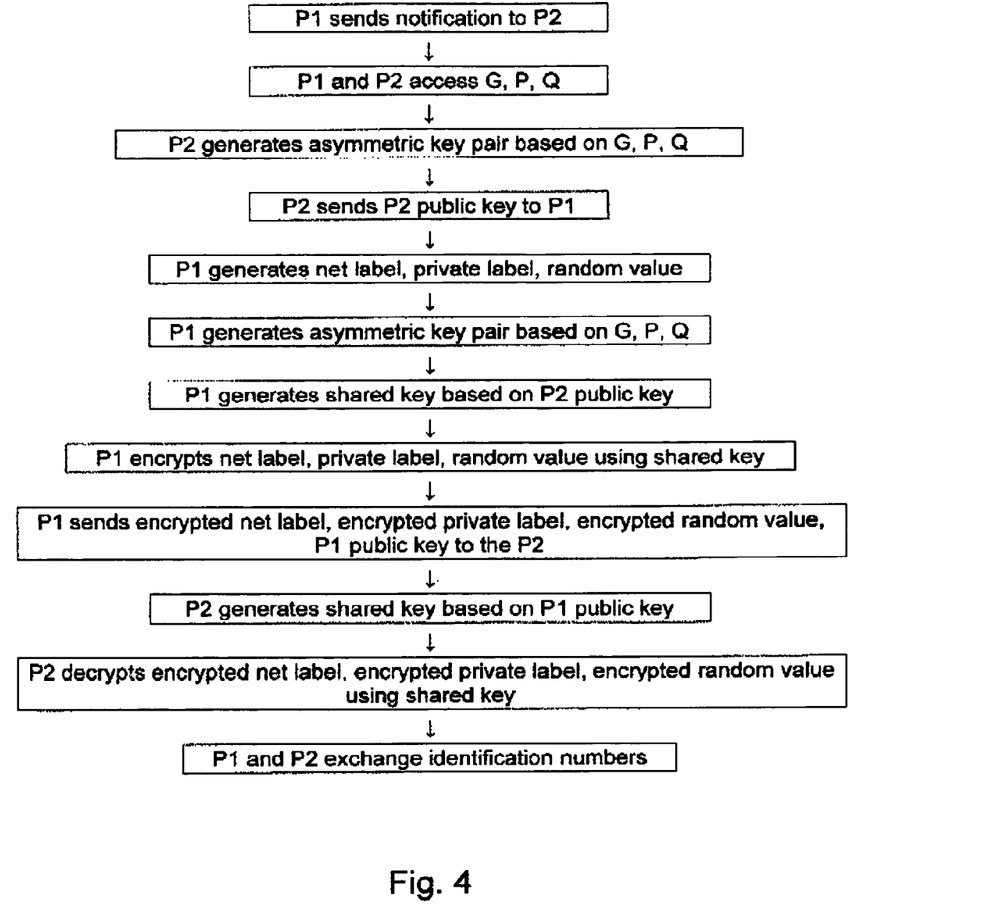
FIG. 4 shows an exemplary communication protocol for a two-party call.

Two Party Call (FIG. 4)

1. A plain text call is initiated between two platform users.
2. One of the users states that he/she is S; a "secure private" button may be pressed to activate the encryption process. The receiving user's platform, R, will automatically sense an initiation and respond sequence as follows (see Figure One for math process):
   a. S tells R that he is going secure. S presses the "secure" button. A coded signal is sent to R that is visually displayed on the R LED that a secure exchange has been initiated. An automated process proceeds.
   b. S creates a Diffie-Hellman asymmetric key pair from the common P, Q, and G parameters, generates a Net label, generates a Private label, and generates a random number.
   c. R generates a Diffie-Hellman asymmetric key pair from the common P, Q, and G parameters.
   d. R sends the public part of the asymmetric key pair to S.
   e. S computes the Diffie-Hellman shared key from the public part of R's asymmetric key pair and encrypts the Net label, Private label, and random number with the shared key.
   f. S sends the encrypted Net label, Private label, and random number and also the public key part of S's own Diffie-Hellman asymmetric key to R.
   g. R computes the Diffie-Hellman shared key from the public key part of S's Diffie-Hellman asymmetric key pair.
   h. R decrypts the labels and random number from S using the Diffie-Hellman computed shared key.
   i. A respective identification number is exchanged and received at both platforms. Either one or both users can do a verbal confirmation of the number via the telephone.
   j. A cancel button or an equivalent is done to break the call.

A Casual Conference Call

The encryption process for the casual conference call is similar to the Two Party call in that a plain text call is initiated between two platform users. A "secure" exchange is completed between the two users as defined in the two party call.

During the phone call exchange, it is decide by one of the parties that an additional user is desired to join the conversation or data exchange. The following steps are done to establish the new user, R1, to the encrypted exchange (see Figure Two for math process).

a. S presses the "hold button with R" that suspends the encrypted channel with R but maintains encryption synchronization. The S LED confirms that R is on hold.
b. S establishes a POTS connection with R1.
c. S tells R1 he is going secure. S presses the "secure" button. A coded signal is sent to R1 that a secure exchange is being initiated; also an LED confirmation is done through the R1 LED. Since there is only one party present, a communication protocol between both parties determines that this is not a broadcast conference call.
d. S generates a Private label (between S and R1) and a Diffie-Hellman asymmetric key pair and sends the public part to R1.
e. R1 generates a Diffie-Hellman asymmetric key pair from the common P, Q, and G parameters and computes the Diffie-Hellman shared key from the public key part from S. R1 sends the public part of the key pair to S.
f. S computes the Diffie-Hellman shared key from the public key of R1.

g. S encrypts the private label, the Net label that was established with R, and the random number established with R and sends this to R1. S retains the private label.
h. R1 decrypts the data from S and retains the Private label.
i. S presses the "hold button with R1" that suspends the encrypted channel with R but maintains encryption synchronization. The S LED confirms that R and R1 are on hold as private conversations.
j. S presses the "Conference button". A coded signal is sent to R and R1 that a conference call is being initiated. A confirmation is done with each R and R1 LED's. S generates a Net label and a new random number.
k. First, S sends, encrypted with R's public key portion, the Net label concatenated with a new random number. An error detection scheme such as a CRC is applied to the combined Net Label and random number; the resultant error detection data is included in the transmission with the label and random number. R receives the data, does a CRC on the data and confirms the data, and decrypts the Net label and a random number with the private portion of the Public key.
l. All three users have a common Net label and common random key from S. A secure conference call may begin.
m. Note: a private conversation may be resumed with either R or R1 by placing the conference call on hold and initiating a secure call.
n. A Cancel button or an equivalent process is done to break the call.

Figure 5:
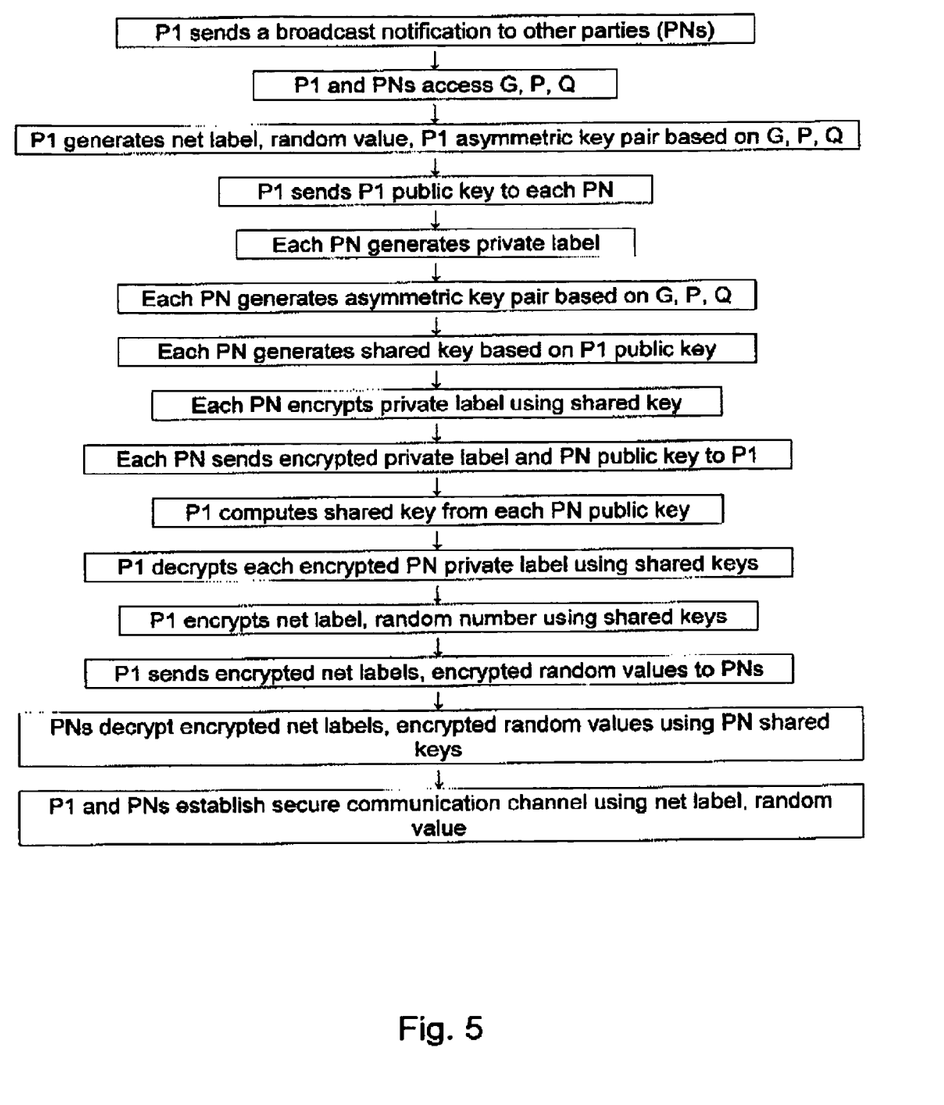
FIG. 5 shows an exemplary communication protocol for a broadcast conference call.

A Broadcast Conference Call (FIG. 5)

The encryption process differs from the casual conference call in that all parties to the conference are available at one time, and secure relationship is established while all the parties are present. The broadcast conference call uses the process of the casual conference call but with a slight change in the sequence (see Figure Three for math process).

After all the parties are connected and confirmed present, one of the parties states that he/she is S:
a. S presses the "secure" button. A coded signal is sent to all other parties present that a secure exchange is being initiated; also an LED confirmation is activated for all the conference call party LED's. A communication protocol is established to activate the secure process in a mutually determined order for each of the conference parties present.
b. Each party completes an exchange with S as follows:
  1. S generates a Net label, Random number and a Diffie-Hellman asymmetric key pair using common P, Q, and G parameters and sends the public part to R.
  2. R generates a Private label (for use between R and S) and a Diffie-Hellman asymmetric key pair from the common P, Q, and G parameters. R computes the Diffie-Hellman shared key from the S's public key. R encrypts the Private label with the shared key. R sends the public key part of his or her asymmetric key pair to S. R also sends the encrypted Private label for R and S.
  3. S computes the Diffie-Hellman shared key from the public key from R. S decrypts the Private label with the shared key. S retains the Private label.
  4. S encrypts the Net label and Random number with the shared key and sends this to R. A CRC is done on the encrypted concatenated numbers, and the CRC number is sent with the encrypted concatenated numbers.
  5. R receives and decrypts the Net label and Random number with the computed shared key. R retains these.
  6. S presses the "hold button with R that suspends the encrypted channel with R but maintains encryption synchronization. The S LED confirms that R is on hold.
  7. R1, and the balance of parties to the conference call would do the above b1 through b6 processes. The LED of S would reflect which of the parties have successfully complete a base secure exchange.
c. S presses the "Conference button". A coded signal is sent to all parties that a conference call is being initiated. A confirmation is done with each party's LED. S generates a Net label and a random number.
d. S sends, encrypted with R's public key portion, the concatenated Net label and random number. S repeats the process with each party to the conference call. The LED of S would reflect which of the parties have been sent the net data.
e. All parties to the conference call have a common Net label and a common random key from S. A secure conference call may begin by using the keying material with an encryption algorithm.
f. Note; a private conversation may be initiated with any of the parties and S by placing the conference on hold and establishing a secure two party call.
g. S presses a Cancel button or an equivalent process to break the conference call.

The invention has been described using exemplary and preferred embodiments. However, the scope of the present invention is not limited to these particular disclosed embodiments. To the contrary, the present invention is contemplated to encompass various modifications and similar arrangements The scope of the claims, therefore, should be accorded the broadest interpretation so as to include all such modifications and similar arrangements.

What is claimed is:

1. A method of establishing a secure communication channel, comprising:
   sending, by a first party a secure call notification to a second party;
   accessing, by the first and second parties, base, prime, and sub-prime parameters;
   generating, by the second party, a second asymmetric key pair comprising a second public key and a second private key, based on the base, prime, and sub-prime parameters;
   sending, by the second party to the first party, the second public key;
   generating, by the first party, a net label, a private label, a random value, a first asymmetric key pair comprising a first public key and a first private key based on the base, prime, and sub-prime parameters, and a shared key based on the second public key;
   encrypting, by the first party, the net label, the private label, and the random value, using the shared key;
   sending, by the first party to the second party, the encrypted net label, the encrypted private label, the encrypted random value, and the first public key;
   generating, by the second party, the shared key based on the first public key;

decrypting, by the second party, the encrypted net label, the encrypted private label, and the encrypted random value using the shared key; and exchanging, by the first and second parties, respective identification numbers to establish the secure communication channel;

wherein the secure call notification is a first secure call notification, the net label is a first net label, the private label is a first private label, the random value is a first random value, the shared key is a first shared key, the encrypted net label is a first encrypted first net label, the encrypted private label is a first encrypted first private label, and the encrypted random value is a first encrypted first random value further, the method further comprising:

designating, by one of the first party and the second party, either of the first party and the second party as a sender, and the other of the first party and the second party as a non-sender;

suspending, by the sender, the secure communication channel between the first party and the second party;

establishing, by the sender, a communication channel with a third party;

sending, by the sender, a second secure call notification to the third party;

accessing, by the third party, the base, prime, and sub-prime parameters;

generating, by the third party, a third asymmetric key pair comprising a third private key and a third public key, based on the base, prime, and sub-prime parameters;

sending, by the third party to the sender, the third public key;

generating, by the sender, a second private label, a second net label, a second random value, a fourth asymmetric key pair comprising a fourth public key and a fourth private key based on the base, prime, and sub-prime parameters, and a second shared key based on the third public key;

encrypting, by the sender, the second private label, the first net label, and the first random value, using the second shared key, to provide an encrypted second private label, a second encrypted first net label, and a second encrypted first random value;

sending, by the sender to the third party, the encrypted second private label, the second encrypted first net label, the second encrypted first random value, and the fourth public key;

generating, by the third party, the second shared key based on the third public key;

decrypting, by the third party, the encrypted second private label, the second encrypted first net label, and the second encrypted first random value, using the second shared key;

suspending, by the sender, the secure communication channel between the sender and the third party;

sending, by the sender to the third party and the non-sender, a conference call notification;

encrypting, by the sender, the second net label and the second random value, using one of the first public key and the second public key, to provide a first encrypted second net label and a first encrypted second random value;

generating, by the sender, a first error detection value for the first encrypted second net label and the first encrypted second random value;

sending, by the sender to the non-sender, the first encrypted second net label, the first encrypted second random value, and the first error correction value;

generating, by the non-sender, a second error detection value, for the first encrypted second net label and the first encrypted second random value;

checking, by the non-sender, the validity of the first encrypted second net label and the first encrypted second random value by comparing the first and second error detection values;

decrypting, by the non-sender, the first encrypted second net label and the first encrypted second random value, using one of the first private key and the second private key;

encrypting, by the sender, the second net label and the second random value, using the third public key, to provide a second encrypted second net label and a second encrypted second random value;

generating, by the sender, a third error detection value, for the second encrypted second net label and the second encrypted second random value;

sending, by the sender to the third party, the second encrypted second net label, the second encrypted second random value, and the third error correction value;

generating, by the third party, a fourth error detection value, for the second encrypted second net label and the second encrypted second random value;

checking, by the third party, the validity of the second encrypted second net label and the second encrypted second random value by comparing the third and fourth error detection values; and decrypting, by the third party, the second encrypted second net label and the second encrypted second random value, using third private key.

2. A method of establishing a secure communication channel, comprising:

establishing a communication link among at least three parties comprising a first party and other parties;

sending, by the first party, a broadcast conference call notification to the other parties;

accessing, by the first party and the other parties, base, prime, and sub-prime parameters;

generating, by the first party, a net label, a random value, and a first asymmetric key pair comprising a first public key and a first private key based on the base, prime, and sub-prime parameters;

sending, by the first party, the first public key to each of the other parties;

generating, by each of the other parties, a respective private label, a respective other asymmetric key pair comprising a respective other public key and a respective other private key based on the base, prime, and sub-prime parameters, and a respective other shared key based on the first public key;

encrypting, by each of the other parties, the respective private label using the respective shared key;

sending, by each of the other parties, the respective encrypted private label and the respective other public key to the first party;

computing, by the first user, each respective shared key from each respective public key sent by the other parties;

decrypting, by the first party, each respective encrypted private label using the respective shared keys;

respectively encrypting, by the first user, the net label and the random number, using the respective shared keys;

sending, by the first party, the respective encrypted net labels and the respective encrypted random values to the respective other parties;

decrypting, by the other parties, the respective encrypted net labels and the respective encrypted random values using the respective shared keys; and establishing, by the first user and the other users, the secure communication channel using the net label and the random value.

3. The method of claim 2, further comprising:

deriving, by the first party, an error checking code for each of the respective other parties from the respective encrypted net labels and the respective encrypted random values;

sending, by the first party, the respective error checking codes to the respective other parties; and confirming, by the other parties, validity of the respective encrypted net labels and the respective encrypted random values using the respective error checking codes.

* * * * *